United States Patent
Chao et al.

(10) Patent No.: US 12,529,918 B2
(45) Date of Patent: Jan. 20, 2026

(54) DYNAMIC NANOPHOTONIC FILTER AND METHOD FOR TUNING AND FABRICATING THE SAME

(71) Applicants: Jeremy Chao, Tempe, AZ (US); Liping Wang, Chandler, AZ (US); Sydney Taylor, Charlestown, RI (US)

(72) Inventors: Jeremy Chao, Tempe, AZ (US); Liping Wang, Chandler, AZ (US); Sydney Taylor, Charlestown, RI (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 433 days.

(21) Appl. No.: 18/304,275

(22) Filed: Apr. 20, 2023

(65) Prior Publication Data

US 2023/0341713 A1 Oct. 26, 2023

Related U.S. Application Data

(60) Provisional application No. 63/333,110, filed on Apr. 20, 2022.

(51) Int. Cl.
  *G02F 1/01* (2006.01)
  *C23C 14/02* (2006.01)
  (Continued)

(52) U.S. Cl.
  CPC .......... *G02F 1/0147* (2013.01); *C23C 14/021* (2013.01); *C23C 14/083* (2013.01);
  (Continued)

(58) Field of Classification Search
  CPC ............... G02F 1/0147; G02F 2202/10; G02F 2202/36; C23C 14/021; C23C 14/083; C23C 14/30; C23C 14/5853
  See application file for complete search history.

(56) References Cited

U.S. PATENT DOCUMENTS

2024/0010910 A1* 1/2024 Araki .................. C09K 9/00
2025/0093345 A1* 3/2025 Mazed ................ G06Q 20/321

OTHER PUBLICATIONS

Abbas, S., Dupont, L.M., Dozov, I.N., Davidson, P., Chanéac, C., "Optical filter based on Fabry-Perot structure using a suspension of goethite nanoparticles as electro-optic material", Proc. SPIE 10555, Emerging Liquid Crystal Technologies XIII, 105550G (2018), doi:10.1117/12.2301290.

(Continued)

*Primary Examiner* — Mariam Qureshi
(74) *Attorney, Agent, or Firm* — FULLER IP LAW LLC; Rodney J. Fuller

(57) ABSTRACT

A dynamic nanophotonic filter and method for tuning and fabricating the same is disclosed. The filter includes a transparent substrate, a first layer of thermochromic $VO_2$ deposed on the substrate with a first thickness, a spacer layer having a spacer thickness and composed of a dielectric material deposed on the first layer, and a second layer of thermochromic $VO_2$ deposed on the spacer layer such that the spacer layer is sandwiched between the second and first layer. The dynamic nanophotonic filter changes between a semi-transparent state and an opaque state based on temperature. The semi-transparent state includes the first and second layers being insulating. The opaque state includes the first layer and the second layer both being metallic. The first thickness, the second thickness, and the spacer thickness are chosen to tune how the dynamic nanophotonic filter behaves in the semi-transparent state and the opaque states.

5 Claims, 16 Drawing Sheets

(51) Int. Cl.
  *C23C 14/08* (2006.01)
  *C23C 14/30* (2006.01)
  *C23C 14/58* (2006.01)
(52) U.S. Cl.
  CPC .......... *C23C 14/30* (2013.01); *C23C 14/5853* (2013.01); *G02F 2202/10* (2013.01); *G02F 2202/36* (2013.01)

(56) References Cited

OTHER PUBLICATIONS

Alipour-Banaei, H., Mehdizadeh, F., "Significant role of photonic crystal resonant cavities in WDM and DWDM communication tunable filters", Optik 124 (17) (2013) 2639-2644 (Stuttg), doi:10.1016/j.ijleo.2012.07.029.

Barker, Jr, A.S., Verleur, H.W., Guggenheim, H.J., "Infrared optical properties of vanadium dioxide above and below the transition temperature", Phys. Rev. Lett. 17 (26) (1966) 2137-2140.

Bierman, D.M., et al., "Radiative thermal runaway due to negative-differential thermal emission across a solid-solid phase transition", Phys. Rev. Appl. 10 (2) (2018) 1-6, doi:10.1103/PhysRevApplied.10.021001.

Cesarini, G., Leahu, G., Belardini, A., Centini, M., Li Voti, R., Sibilia, C., "Quantitative evaluation of emission properties and thermal hysteresis in the mid-infrared for a single thin film of vanadium dioxide on a silicon substrate", Int. J. Therm. Sci. 146 (2019) 106061, doi:10.1016/j.ijthermalsci.2019.106061.

Cesarini, G., Leahu, G., Voti, R.L., Sibilia, C., "Long-wave infrared emissivity charac-terization of vanadium dioxide-based multilayer structure on silicon substrate by temperature-dependent radiometric measurements", Infrared Phys. Technol. 93 (2018) 112-115, doi:10.1016/j.infrared.2018.07.032.

Cesca, T., et al., "Correlation between in situ structural and optical character-ization of the semiconductor-to-metal phase transition of VO2 thin films on sapphire", Nanoscale 12 (2) (2020) 851-863, doi:10.1039/c9nr09024j.

Chain. E.E., "Optical properties of vanadium dioxide and vanadium pentoxide thin films," Appl. Opt. 30 (19) (1991) 2782, doi:10.1002/pssa.2211530218.

Chang, T., et al., "Optical design and stability study for ultrahigh-performance and long-lived vanadium dioxide-based thermochromic coatings", Nano Energy 44 (2018) 256-264 Oct. 2017, doi:10.1016/j.nanoen.2017.11.061.

Chao, J., Taylor, S., and Wang, L.P., 2022, "Design and Energy Analysis of Tunable Nanophotonic Infrared Filter based on Thermochromic Vanadium Dioxide," International Journal of Heat and Mass Transfer, vol. 186, p. 122515.

Chen, M., Morsy, A.M., Povinelli, M.L., "Design of VO2-coated silicon microspheres for thermally-regulating paint", Opt. Express 27 (15) (2019) 21787, doi:10.1364/oe.27.021787.

Chodorow, U., Mazur, R., Morawiak, P., Herman, J., Harmata, P., Martyniuk, P., "Switchable Fabry-Perot filter for mid-infrared radia-tion", Liq. Cryst. 46 (12) (2019) 1877-1880, doi:10.1080/02678292.2019.1613576.

Coskun, O.D., Demirel, S., Atak, G., "The effects of heat treatment on optical, structural, electrochromic and bonding properties of Nb2 O5 thin films", J. Al-loy. Compd. 648 (2015) 994-1004, doi:10.1016/j.jallcom.2015.07.053.

Demiryont, H., Moorehead, D., "Electrochromic emissivity modu-lator for space-craft thermal management", Sol. Energy Mater. Sol. Cells 93 (12) (2009) 2075-2078, doi:10.1016/j.solmat.2009.02.025.

Franke, E.B., Trimble, C.L., Hale, U.S., Schubert, M., Woollam, J.A., "Infrared switch-ing electrochromic devices based on tungsten oxide", J. Appl. Phys. 88 (10) (2000) 5777-5784, doi:10.1063/1.1319325.

Hale, U.S., DeVries, M., Dworak, B., Woollam, J.A., "Visible and infrared optical con-stants of electrochromic materials for emissiv-ity modulation applications", Thin Solid Films 313-314 (1998) 205-209, doi:10.1016/S0040-6090(97)00818-3.

Ji, H., Liu, D., Cheng, H., Zhang, C., Yang, L., "Vanadium dioxide nanopowders with tunable emissivity for adaptive infrared camou-flage in both thermal atmo-spheric windows", Sol. Energy Mater. Sol. Cells 175 (2018) 96-101 Nov. 2017, doi:10.1016/j.solmat.2017.10.013.

Kilian. K.A., Böcking, T., Gaus, K., Gal, M., Gooding, J.J., "Peptide-modified optical filters for detecting protease activity", ACS Nano 1 (4) (2007) 355-361.

Kim, S.J., et al., "Dynamic phase-change metafilm absorber for strong designer modulation of visible light," Nanophotonics 10 (1) (2020) 713-725, doi:10.1515/nanoph-2020-0264.

Larciprete, M.C., et al., "Effect of heating/cooling dynamics in the hysteresis loop and tunable IR emissivity of VO2 thin films", Opt. Express 28 (26) (2020) 39203, doi:10.1364/oe.411556.

Lee, S.J., et al., "Crystalline WO3 nanoparticles for highly improved elec-trochromic applications", Adv. Mater. 18 (6) (2006) 763-766, doi:10.1002/adma.200501953.

Lenz, G., Eggleton, B.J., Madsen, C.K., Giles, C.R., Nykolak, G., "Dispersive properties of optical filters for WDM systems", IEEE Photonics Technol. Lett. 10 (3) (1998) 567-569, doi:10.1109/68.662596.

Li, H . . . , "Refractive index of alkaline earth halides and its wavelength and tem-perature derivatives", J. Phys. Chem. Ref. Data 5 (2) (1976) 329-528, doi:10. 1063/1.555616.

Li, S.Y., Niklasson, G.A., Granqvist, C.G., "Thermochromic fen-estration with VO2-based materials: three challenges and how they can be met", Thin Solid Films 520 (10) (2012) 3823-3828, doi:10.1016/j.tsf.2011.10.053.

Long, L., Taylor, S., Ying, X., Wang, L., "Thermally-switchable spectrally-selective infrared metamaterial absorber/emitter by tun-ing magnetic polariton with a phase-change VO2 layer", Mater. Today Energy 13 (2019) 214-220, doi:10.1016/ j.mtener.2019.05.017.

Philip, J., Jaykumar, T., Kalyanasundaram, P., Raj, B., "A tunable optical filter, " Meas. Sci. Technol. 14 (8) (2003) 1289-1294, doi:10.1088/0957-0233/14/8/314.

Powell, M.J., et al., "Intelligent multifunctional VO2 /SiO2 /TiO2 coatings for self-cleaning, energy-saving window panels", Chem. Mater. 28 (5) (2016) 1369-1376, doi:10.1021/acs.chemmater.5b04419.

Qazilbash, M.M., et al., "Mott transition in VO2 revealed by infrared spectroscopy and nano-imaging", Science 318 (5857) (2007) 1750-1753 (80-, doi:10.1126/ science. 1150124.

Qi, D., Wang, X., Cheng, Y., Chen, F., Liu, L., Gong, R., "Quasi-periodic photonic crys-tal Fabry-Perot optical filter based on Si/SiO2 for visible-laser spectral selectivity", J. Phys. D Appl. Phys. 51 (22) (2018), doi:10.1088/1361-6463/aabf83.

Redel, E., et al., "Electrochromic bragg mirror":ECBM, Adv. Mater. 24 (35) (2012) 265-269, doi:10.1002/adma.201202484.

Sadot, D., Boimovich, E., "Tunable optical filters for dense WDM networks", IEEE Commun. Mag. (1998), doi:10.1201/9781420019520.ch6.

Sun, K., et al., "VO2 thermochromic metamaterial-based smart optical solar reflector", ACS Photonics 5 (6) (2018) 2280-2286, doi:10.1021/acsphotonics. 8b00119.

Tavousi, A., Mansouri-Birjandi, M.A., Janfaza, M., "Optoelectronic application of graphene nanoribbon for mid-infrared bandpass fil-tering", Appl. Opt. 57 (20) (2018) 5800, doi:10.1364/ao.57.005800.

Taylor, S., Chao, J., Long, L., Vlastos, N., Wang, L., "Temperature-dependent optical characterization of VO2 thin film prepared from furnace oxidation method", ES Mater. Manuf. 6 (2019) 62-67, doi:10.30919/esmm5f607.

Taylor, S., Long, L., McBurney, R., Sabbaghi, P., Chao, J., Wang, L., "Spectrally-selective vanadium dioxide based tunable metafilm emitter for dynamic radiative cooling," Sol. Energy Mater. Sol. Cells 217 (2020) 110739, doi:10.1016/j. solmat.2020.110739.

Taylor, S., Long, L., Wang, L., "Fabrication and characterization of furnace oxidized vanadium dioxide thin films", Thin Solid Films 682 (2019) 29-36, doi:10.1016/j. tsf.2019.05.021.

(56) References Cited

OTHER PUBLICATIONS

Taylor, S., Yang, Y., Wang, L., "Vanadium dioxide based Fabry-Perot emitter for dynamic radiative cooling applications", J. Quant. Spectrosc. Radiat. Transf. 197 (2017) 76-83.

Voti, R.L., Larciprete, M.C., Leahu, G., Sibilia, C., Bertolotti, M., "Optimization of thermochromic VO2 based structures with tunable thermal emissivity", J. Appl. Phys. 112 (3) (2012), doi:10.1063/1.4739489.

Wang, H., Liu, X., Wang, L., Zhang, Z., "Anisotropic optical properties of silicon nanowire arrays based on the effective medium approximation", Int. J. Therm. Sci. 65 (2013) 62-69, doi:10.1016/j.ijthermalsci.2012.08.018.

Wang, Z., et al., Towards full-color tunability of inorganic electrochromic devices using ultracompact Fabry-Perot nanocavities, Nat. Commun. 11 (1) (2020) 1-9, doi:10.1038/s41467-019-14194-y.

Williams, C., Hong, N., Julian, M., Borg, S., Kim, H.J., "Tunable mid-wave infrared FabryPerot bandpass filters using phase-change GeSbTe", Opt. Express 28 (7) (2020) 1058310594, doi:10.1364/OE.390538.

Wu, S.H., et al., "Thermal homeostasis using microstructured phase-change materials", Optica 4 (11) (2017) 1390, doi:10.1364/optica.4.001390.

Yang, Z., et al., "Reflective color filters and monolithic color printing based on asymmetric Fabry-Perot cavities using nickel as a broadband absorber", Adv. Opt. Mater. 4 (8) (2016) 1196-1202, doi:10.1002/adom.201600110.

* cited by examiner

DYNAMIC NANOPHOTONIC FILTER AND METHOD FOR TUNING AND FABRICATING THE SAME

RELATED APPLICATIONS

This application claims the benefit of U.S. provisional patent application 63/333,110, filed Apr. 20, 2022, titled "Tunable Nanophotonic Infrared Filter," the entirety of the disclosure of which is hereby incorporated by this reference.

TECHNICAL FIELD

Aspects of this document relate generally to dynamic nanophotonic filters.

BACKGROUND

Heat can be a problem for a broad range of technologies. Whether there is too much heat, or too little, thermal control can play an important role in numerous applications including energy-efficient building materials, military aircraft, and spacecraft. Of particular interest is thermal control through selective radiative emission. Band-pass optical filters allow only incident light within a desired spectral range to be transmitted through or reflected from the device. Key parameters of filters are the central or peak wavelength and the range of wavelengths that are permitted.

The optical properties of many thin-film based optical filters, particularly the characteristics of their peak, may be modified through changes to the structure at the time of fabrication. After fabrication, it can be beneficial for filters to actively tune their properties in response to changes in their environment or a user-controlled input. Materials which are able to change their optical properties in response to an applied voltage (i.e., electrochromic materials), or in response to their temperature (i.e., thermochromic), can be incorporated into a filter to achieve this, as is known in the art.

Thermochromic materials offer some advantages over electrochromic materials, particularly their ability to passively modulate their optical properties in response to their environment without the need for external and potentially complex electrical systems. This is very useful for smart windows, where a higher temperature may indicate a need to reduce incident infrared radiation, as well as in thermal emitters, where low emittance is desired when the object is cool in order to restrain radiative cooling while high emittance is desired when the object is hot in order to promote radiative cooling.

Vanadium dioxide is a thermochromic insulator-to-metal material, behaving as a monoclinic insulator beneath its transition temperature of around 340 K but as a rutile metal once that temperature is exceeded. The dramatic shift in the optical properties of vanadium dioxide between these two states can be incorporated into tunable emitters made of metamaterials and metafilms. Depending on the fabrication method and conditions, the transition is centered around 340 K and has a thermal bandwidth of anywhere between 8 K to 20 K.

SUMMARY

According to one aspect, a method for fabricating a tuned dynamic nanophotonic filter includes tuning a dynamic nanophotonic filter that changes between a semi-transparent state and an opaque state based on temperature. The dynamic nanophotonic filter has a transparent substrate, a first layer of thin-film thermochromic $VO_2$, a spacer layer, and a second layer of thin-film thermochromic $VO_2$. The tuning includes choosing a first thickness of the first layer, a second thickness of the second layer, and a spacer thickness of the spacer layer such that the dynamic nanophotonic filter exhibits a desired behavior in at least one of the semi-transparent state and the opaque state. The method also includes fabricating the tuned dynamic nanophotonic filter by depositing a first precursor layer of vanadium directly onto a transparent substrate composed of calcium fluoride ($CaF_2$), and oxidizing the first precursor layer until the vanadium of the first precursor layer is fully oxidized and the first precursor layer becomes the first layer of thin-film thermochromic $VO_2$ as determined by the examination of a first spectral transmittance, with the first precursor layer sized such that the first layer has the first thickness. Fabricating the tuned dynamic nanophotonic filter also includes depositing the spacer layer directly onto the first layer, with the spacer layer composed of intrinsic silicon and having the spacer thickness, depositing a second precursor layer of vanadium directly onto the spacer layer, and oxidizing the second precursor layer until the vanadium of the second precursor layer is fully oxidized and the second precursor layer becomes the second layer of thin-film thermochromic $VO_2$ as determined by the examination of a first spectral transmittance, with the second precursor layer sized such that the second layer has the second thickness.

Particular embodiments may comprise one or more of the following features. The spacer thickness may be chosen to tune the dynamic nanophotonic filter to have a transmittance peak in a target spectral location when in the semi-transparent state. The first thickness and the second thickness may be chosen to tune the dynamic nanophotonic filter to exhibit an attenuation when in the opaque state. The first thickness, the second thickness, and the spacer thickness may be each chosen to tune the dynamic nanophotonic filter to maximize a power transmission difference between the semi-transparent state and the opaque state while the dynamic nanophotonic filter may be exposed to a radiation. The radiation may be from a blackbody emitter at 900 k. The first thickness and the second thickness may be each 100 nm. The spacer thickness may be 900 nm.

According to another aspect of the disclosure, a method for fabricating a tuned dynamic nanophotonic filter includes tuning a dynamic nanophotonic filter that changes between a semi-transparent state and an opaque state based on temperature. The dynamic nanophotonic filter has a transparent substrate, a first layer of thin-film thermochromic $VO_2$, a spacer layer, and a second layer of thin-film thermochromic $VO_2$. The tuning includes choosing a first thickness of the first layer, a second thickness of the second layer, and a spacer thickness of the spacer layer such that the dynamic nanophotonic filter exhibits a desired behavior in at least one of the semi-transparent state and the opaque state. The method also includes fabricating the tuned dynamic nanophotonic filter by depositing a first precursor layer of vanadium directly onto a transparent substrate, oxidizing the first precursor layer until the vanadium of the first precursor layer is fully oxidized and the first precursor layer becomes the first layer of thin-film thermochromic $VO_2$, with the first precursor layer sized such that the first layer has the first thickness, and depositing the spacer layer directly onto the first layer, the spacer layer composed of a dielectric material and having the spacer thickness. Fabricating the tuned dynamic nanophotonic filter also includes depositing a second precursor layer of vanadium directly onto the spacer layer, and oxidizing the second precursor layer until the vanadium of the second precursor layer is fully oxidized and the second precursor layer becomes the second layer of thin-film thermochromic VO_2, with the second precursor layer sized such that the second layer has the second thickness.

Particular embodiments may comprise one or more of the following features. Oxidizing the first precursor layer may include determining when the vanadium of the first precursor layer has been fully oxidized by examining a first spectral transmittance. Oxidizing the second precursor layer may include determining when the vanadium of the second precursor layer has been fully oxidized by examining a second spectral transmittance. The spacer thickness may be chosen to tune the dynamic nanophotonic filter to have a transmittance peak in a target spectral location when in the semi-transparent state. The first thickness and the second thickness may be chosen to tune the dynamic nanophotonic filter to exhibit an attenuation when in the opaque state. The first thickness, the second thickness, and/or the spacer thickness may be each chosen to tune the dynamic nanophotonic filter to maximize a power transmission difference between the semi-transparent state and the opaque state while the dynamic nanophotonic filter may be exposed to a radiation. The radiation may be from a blackbody emitter at 900 k. The first thickness and the second thickness may be each 100 nm. The spacer thickness may be 900 nm and the dielectric material may be intrinsic silicon. The transparent substrate may be composed of calcium fluoride (CaF_2). The dielectric material may be intrinsic silicon.

According to yet another aspect of the disclosure, a dynamic nanophotonic filter includes a transparent substrate, a first layer of thin-film thermochromic vanadium dioxide (VO_2) deposed on the transparent substrate, with the first layer having a first thickness, and a spacer layer having a spacer thickness, with the spacer layer composed of a dielectric material and deposed on the first layer. The filter also includes a second layer of thin-film thermochromic VO_2 deposed on the spacer layer opposite the first layer such that the spacer layer is sandwiched between the second layer and the first layer. The dynamic nanophotonic filter changes between a semi-transparent state and an opaque state based on temperature. The semi-transparent state includes the first layer and the second layer both being insulating. The opaque state includes the first layer and the second layer both being metallic. The first thickness, the second thickness, and the spacer thickness are chosen to tune how the dynamic nanophotonic filter behaves in the semi-transparent state and the opaque state.

Particular embodiments may comprise one or more of the following features. The spacer thickness may be chosen to tune the dynamic nanophotonic filter to have a transmittance peak in a target spectral location when in the semi-transparent state. The first thickness and the second thickness may be chosen to tune the dynamic nanophotonic filter to exhibit an attenuation when in the opaque state. The first thickness, the second thickness, and/or the spacer thickness may be each chosen to tune the dynamic nanophotonic filter to maximize a power transmission difference between the semi-transparent state and the opaque state while the dynamic nanophotonic filter may be exposed to a radiation. The radiation may be from a blackbody emitter at 900 k. The first thickness and the second thickness may be each 100 nm. The spacer thickness may be 900 nm and the dielectric material may be intrinsic silicon. The transparent substrate may be composed of calcium fluoride (CaF_2). The dielectric material may be intrinsic silicon.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
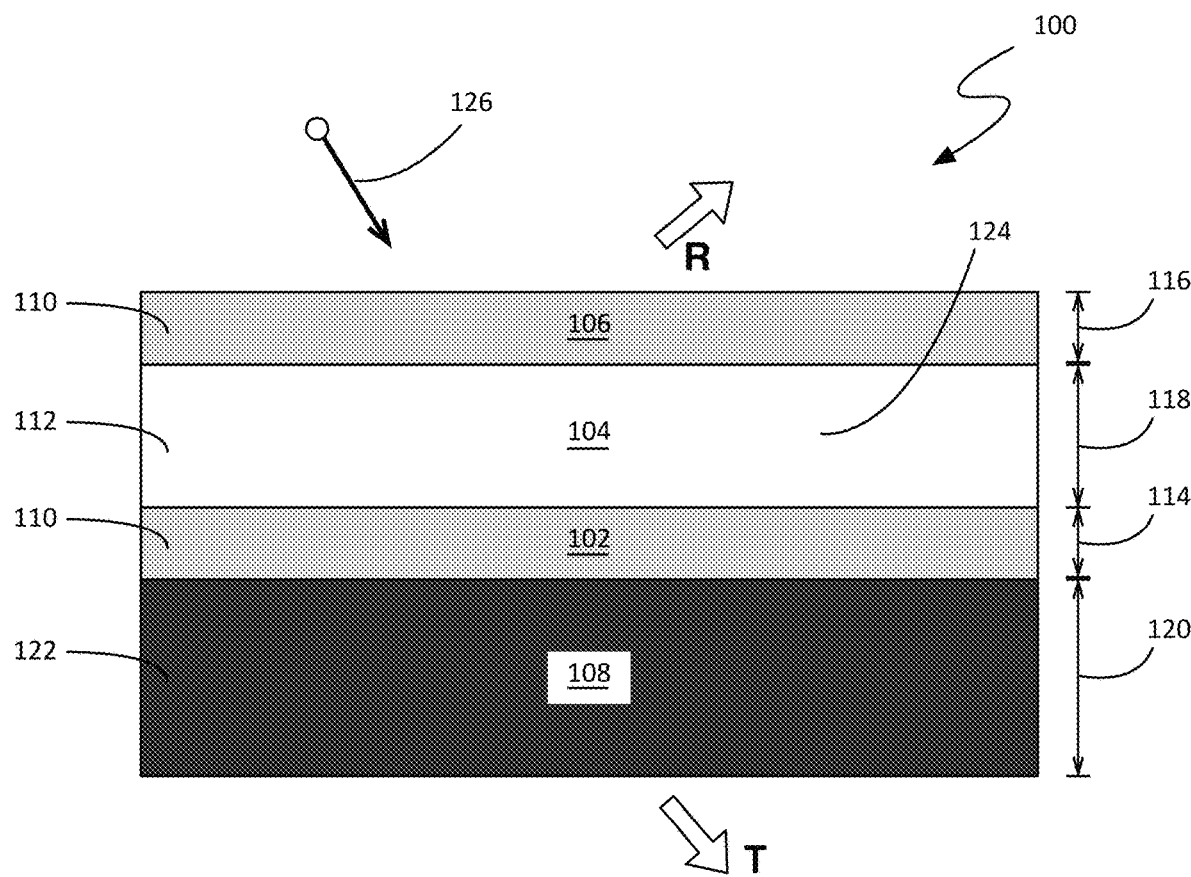
FIG. 1 is a schematic view of a tuned dynamic nanophotonic filter.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Heat can be a problem for a broad range of technologies. Whether there is too much heat, or too little, thermal control can play an important role in numerous applications including energy-efficient building materials, military aircraft, and spacecraft. Of particular interest is thermal control through selective radiative emission. Band-pass optical filters allow only incident light within a desired spectral range to be transmitted through or reflected from the device. Key parameters of filters are the central or peak wavelength and the range of wavelengths that are permitted.

The optical properties of many thin-film based optical filters, particularly the characteristics of their peak, may be modified through changes to the structure at the time of fabrication. After fabrication, it can be beneficial for filters to actively tune their properties in response to changes in their environment or a user-controlled input. Materials which are able to change their optical properties in response to an applied voltage (i.e., electrochromic materials), or in response to their temperature (i.e., thermochromic), can be incorporated into a filter to achieve this, as is known in the art.

Thermochromic materials offer some advantages over electrochromic materials, particularly their ability to passively modulate their optical properties in response to their environment without the need for external and potentially complex electrical systems. This is very useful for smart windows, where a higher temperature may indicate a need to reduce incident infrared radiation, as well as in thermal emitters, where low emittance is desired when the object is cool in order to restrain radiative cooling while high emittance is desired when the object is hot in order to promote radiative cooling.

Vanadium dioxide is a thermochromic insulator-to-metal material, behaving as a monoclinic insulator beneath its transition temperature of around 340 K but as a rutile metal once that temperature is exceeded. The dramatic shift in the optical properties of vanadium dioxide between these two states can be incorporated into tunable emitters made of metamaterials and metafilms. Depending on the fabrication method and conditions, the transition is centered around 340 K and has a thermal bandwidth of anywhere between 8 K to 20 K.

Contemplated herein is a tunable, dynamic nanophotonic infrared filter that is based on vanadium dioxide, a thermochromic insulator-to-metal material. This tunable nanophotonic filter (hereinafter "tunable filter" or "filter" only (or almost only) allows incident light within a desired spectral range to be transmitted through or reflected from a source, such as a device.

According to various embodiments, the filter is composed of a multi-layered structure of silicon, thermochromic $VO_2$ and an IR transparent substrate. The thermochromic $VO_2$ results in a dynamic filter, able to change properties based on temperature. For example, according to various embodiments, the filter may have a narrow-band transmittance peak in the mid-IR at 4 μm wavelength when the filter is cold, and become opaque when the filter is heated beyond the phase transition temperature of the $VO_2$ layers. The dynamic nature of the filter makes it well adapted for use in applications where filtering is only desired in certain circumstances. Having active control of the amount of infrared light transmitted through a material is ideal for applications such as dynamic energy dissipation and switchable thermal camouflage.

In addition to being dynamic, the contemplated filter is tunable. The thicknesses chosen for the various layers can be used to tune the filter to operate on a desired spectral range. While much of the discussion below is done in the context of a filter having a narrow-band transmittance peak in the mid-infrared spectrum at a 4 µm wavelength (when colder than the transition temperature), it should be noted that in other embodiments, the filter may be tuned to have a different transmittance peak which may be advantageous for specific applications.

It should also be noted that while the following discussion is focused on dynamic nanophotonic filters using $VO_2$ and intrinsic silicon, the methods and structures contemplated herein may be adapted for use with other thermochromic materials, as well as with electrochromic materials, as well as different dielectric materials, according to various embodiments.

FIG. 1 is a schematic view of a non-limiting example of a tuned dynamic nanophotonic filter 100. As shown, the filter 100 comprises a thin-film spacer layer 104 that is sandwiched between two thin-film layers (i.e., first layer 102 and second layer 106) of thermochromic vanadium dioxide 110 ($VO_2$). The first layer 102 and second layer 106 of vanadium dioxide 110, separated by the spacer layer 104, form a Fabre-Perot cavity, according to various embodiments. The Fabre-Perot cavity results in a transmittance peak when the thermochromic layers are insulating (i.e., below the phase transition temperature).

According to various embodiments, all of these layers are deposed on top of an infrared-transparent substrate 108 whose thickness (i.e., substrate thickness 120) is much larger than the wavelength. Exemplary substrate materials include, but are not limited to, calcium fluoride 122 ($CaF_2$). calcium fluoride 122 may be advantageous as the substrate material according to various embodiments, due to a low index of refraction and negligible extinction coefficient across the mid-infrared spectrum, leading to high transparency within the region.

The spacer layer 104 is a dielectric material 112. According to various embodiments, the spacer layer 104 may be composed of intrinsic (i.e., undoped) silicon 124. Other embodiments may use different dielectric materials 112. Intrinsic silicon 124 may be advantageous as the spacer material due to its lossless nature and high index of refraction, causing a higher optical thickness. When the vanadium dioxide 110 is in its insulating state, a Fabry-Perot interference effect within the spacer layer 104 occurs due to the large refraction index-change at the interfaces, creating a transmittance peak. When the vanadium dioxide 110 is in the metallic state, the light is significantly attenuated, and the structure becomes broadly opaque.

According to various embodiments, the nanophotonic filter 100 is spectrally selective so long as the vanadium dioxide 110 is insulating, as only radiation 126 within the designated transmittance peak will be able to pass through the filter. The dynamic nanophotonic filter 100 changes between a semi-transparent state and an opaque state, based on the temperature of the filter 100. The semi-transparent state is when the first layer 102 and the second layer 106 are both insulating, and the opaque state is when the first layer 102 and the second layer 106 both metallic.

As will be discussed, in some embodiments this dynamic nature may be harnessed in applications where the temperature of the filter 100 coincides with the circumstances where filtering is desired, while in other embodiments, this switching between semi-transparent and opaque states may be triggered with the deliberate application of heat to the filter 100 from a heat source.

The contemplated filter 100 design allows for tunability. The layer thicknesses (i.e., the first thickness 114 of the first layer 102, the spacer thickness 118 of the spacer layer 104, and the second thickness 116 of the second layer 106) chosen at the time of fabrication influence how the resulting dynamic nanophotonic filter 100 behaves in the semi-transparent state and the opaque state.

For example, the spacer thickness 118 may be chosen to tune the spectral location of the transmittance peak, such that it is in the target spectral location when the filter 100 is in the semi-transparent state. According to various embodiments, an increase in spacer thickness will shift the peak into longer wavelengths, while a decrease in spacer thickness will shift the peak into shorter wavelengths.

Additionally, the first thickness 114 and the second thickness 116 may be chosen to tune the dynamic nanophotonic filter 100 to exhibit an attenuation when in the opaque state. Increasing the thicknesses of the vanadium dioxide 110 layers will increase the transmission modulation between the filter's semi-transparent and opaque states, as the metallic vanadium dioxide 110 layers will become optically thicker.

According to some embodiments, the ultimate goal in tuning a dynamic nanophotonic filter 100, apart from operating on the desired wavelengths, is to maximize the contrast between the two states. More specifically, in some embodiments, the tuning of a dynamic nanophotonic filter 100 comprises choosing the thicknesses of the layers to maximize a power transmission difference between the semi-transparent state and the opaque state while the dynamic nanophotonic filter 100 is exposed to a radiation 126 (i.e., the exposure associated with the intended application). Tuning will be discussed further in the context of FIGS. 5, 8A, 8B, and 10A-C, below.

The thicknesses of the various layers may vary, depending on the desired optical and/or mechanical properties for a particular application. As a specific, non-limiting example that will be the focus of the following discussion, in one embodiment, the $VO_2$ layers may be 50 nm thick, the silicon spacer layer 104 may be 400 nm thick, and the $CaF_2$ transparent substrate 108 may be 1 mm thick.

Figure 2:
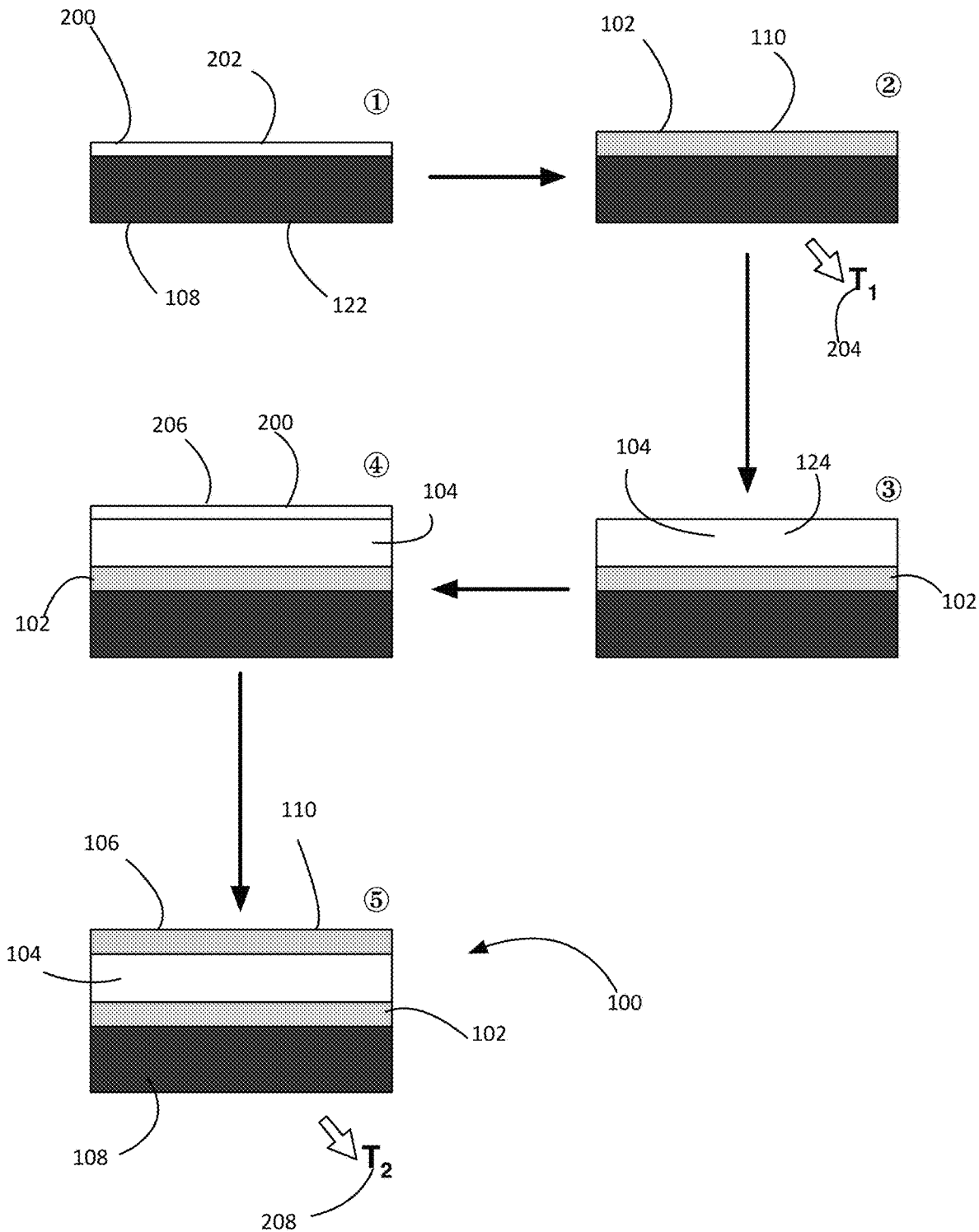
FIG. 2 is a process view of a method for fabricating a dynamic nanophotonic filter.

FIG. 2 is a process view of a non-limiting example of a method for fabricating a dynamic nanophotonic filter 100. It should be noted that this fabrication process does not include tuning. In the context of the present description and the claims that follow, tuning comprises choosing a first thickness 114 of the first layer 102 and a second thickness 116 of the second layer 106, and/or a spacer thickness 118 of the spacer layer 104 such that the dynamic nanophotonic filter 100 exhibits a desired behavior in at least one of the semi-transparent state and the opaque state. The fabrication process to be discussed in the context of FIG. 2 may be used to make tuned dynamic nanophotonic filters 100 (i.e., layer thickness or thicknesses chosen to achieve a specific result) or general purpose dynamic nanophotonic filter 100 whose layer thicknesses were chosen using some other criteria (e.g., mechanical strength, cost, size, fabrication speed, etc.). Tuning will be discussed in greater detail elsewhere.

First, a first precursor layer 200 is deposited or deposed on a transparent substrate 108. See 'circle 1'. Thermochromic $VO_2$ 110 can be very difficult to directly form into thin films. According to various embodiments, the thermochromic layers may be formed in place, by first depositing a first precursor layer 200 of vanadium 202 directly onto the transparent substrate 108, and then oxidized. In other embodiments, the thermochromic layers may be formed using other methods known in the art.

This discussion of a non-limiting example of the contemplated process will be accompanied by a specific, non-limiting example of this fabrication method in use. Those skilled in the art will recognize that other equipment, measurements, and/or techniques may be used to accomplish various steps of this exemplary fabrication process. In this example, the component materials will be deposited on 1 inch diameter double-side-polished 1-mm thick $CaF_2$ substrates (i.e., from MSE Supplies). These transparent substrates 108 are first cleaned with acetone and isopropyl alcohol, then blow dried with nitrogen gas before deposition. Electron beam evaporation (i.e., with a Lesker PVD75 Electron Beam Evaporator) may be used to deposit a 25 nm first precursor layer 200 of vanadium 202 from vanadium pellets (i.e., 99.99% purity from Kurt J. Lesker Co). The base pressure of the chamber and deposition rate may be kept at 0.003 mTorr and 0.7 Å/s, respectively.

Next, the first precursor layer 200 is oxidized until the vanadium 202 of the first precursor layer 200 is fully, or sufficiently, oxidized and the first precursor layer 200 becomes the first layer 102 of thin-film thermochromic $VO_2$ 110 having a first thickness 114. See 'circle 2'. It should be noted that the vanadium 202 expands during the oxidation. According to various embodiments, the thickness of the first precursor layer 200 is chosen such that the resulting $VO_2$ layer is the intended or tuned thickness. According to various embodiments, the oxidation continues until it is determined that the vanadium 202 of the first precursor layer 200 has been fully, or sufficiently, oxidized. In some embodiments, this determination may be made by examining at least a first spectral transmittance 204 of the partially fabricated filter. For example, in one embodiment, it is determined that the vanadium 202 is fully oxidized by looking at the room- and high-temperature spectral transmittances (e.g., at temperatures associated with the two thermochromic states) of the partially assembled filter 100. In some embodiments, the first precursor layer 200 is fully or sufficiently oxidized when the contrast in transmittance between the two states is maximized, or no longer improving.

In other embodiments, the determination of whether the first precursor layer 200 has been fully oxidized may be made by looking for a first spectral transmittance 204 to rise above a particular threshold. That threshold may be associated with the known transmittances of other layers, such as the dielectric material 112 of the spacer layer 104. As a specific example, in one embodiment, the vanadium 202 of the second precursor layer 206 is determined to be fully oxidized, or sufficiently oxidized, when the transmittance in the infrared (while in the insulating state) exceeds 50%, which is roughly the transmittance of the silicon used as the dielectric material 112 in the spacer layer 104.

Continuing with the specific example, the samples are oxidized in a Thermco Minibrute tube furnace at ambient pressure to oxidize the vanadium metal to vanadium dioxide 110. This doubles the thin film thickness (i.e., first thickness 114) to 50 nm in the process. The tube furnace is then purged with 70 SLPM nitrogen gas while heating to a steady state temperature of 300° C. before the samples are loaded onto a quartz boat and heated until fully oxidized while 0.5 SLPM of oxygen gas is added to the 70 SLPM nitrogen gas flow. The sample is monitored in order to determine when the first precursor layer 200 is fully oxidized by examining the room- and high-temperature spectral transmittances (e.g., at temperatures associated with the two thermochromic states). These measurements have indicated that a 9-hour oxidation process is sufficient to fully oxidize this thickness of vanadium dioxide 110.

Next, the spacer layer 104 is deposited onto the first layer 102. See 'circle 3'. The spacer layer 104 is composed of a dielectric material 112 and has a spacer thickness 118. Continuing with the specific, non-limiting example, undoped silicon 124 is then sputtered (i.e., with a Lesker Sputterer) for a thin-film thickness of 500 nm to create the spacer layer 104. The base pressure of the sputtering chamber is set to 1e-6 Torr, while the deposition pressure of the chamber is held at 4 mTorr. The silicon 124 is sputtered at a deposition rate of 0.5 Å/s, and the deposition process is paused for 10 minutes after every 30 minutes of deposition to prevent overheating-related damages to the silicon target.

Finally, the second precursor layer 206 is deposed on the spacer layer 104 (i.e., 'circle 4'), and then oxidized (i.e., 'circle 5') following the same process used for the first layer 102 of vanadium dioxide 110. In the specific example, another 25 nm layer of vanadium is evaporated and oxidized following the same process described previously.

Figure 3A:
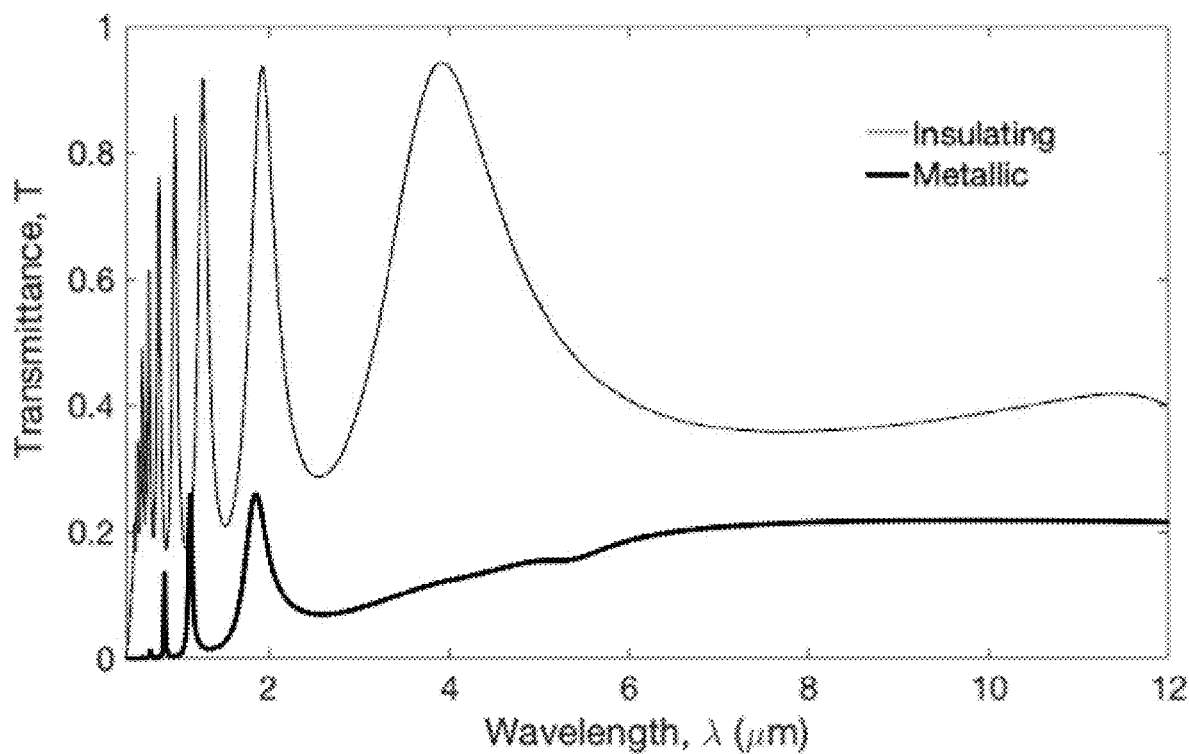
FIGS. 3A-3C show calculated transmittance, reflectance, and absorptance spectrums for a specific embodiment of the tuned dynamic nanophotonic filter, respectively.
Figure 3B:
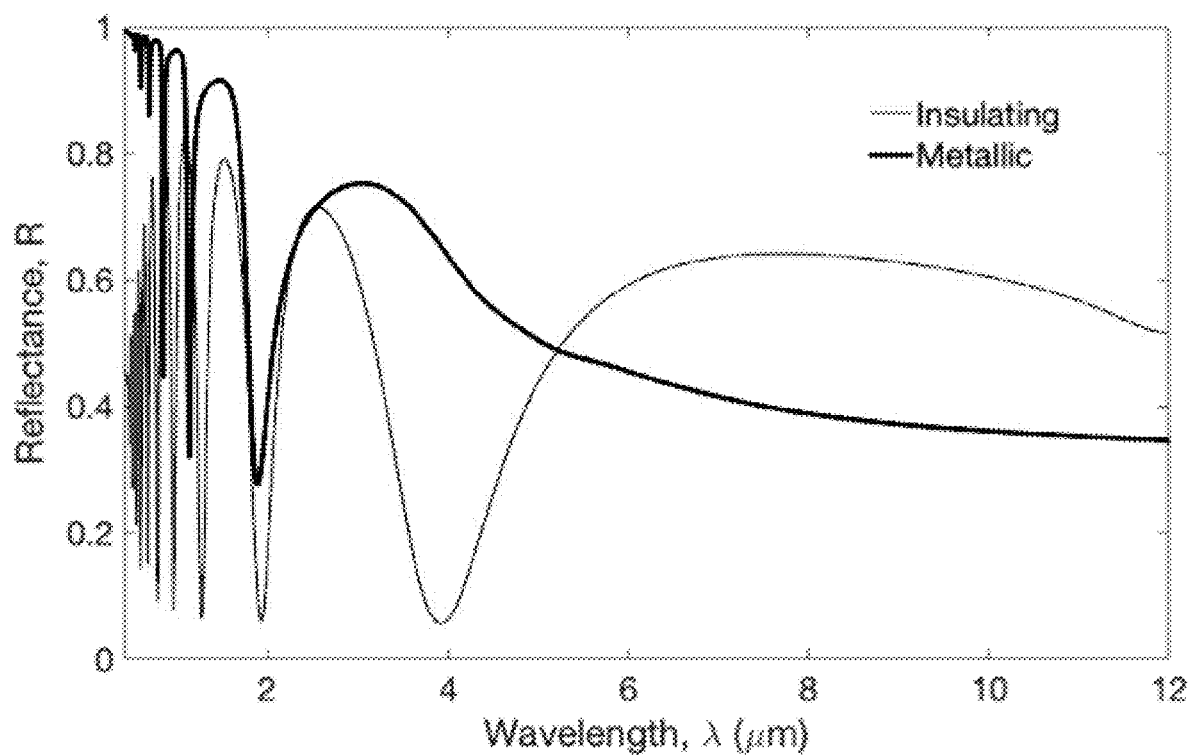
Figure 3C:
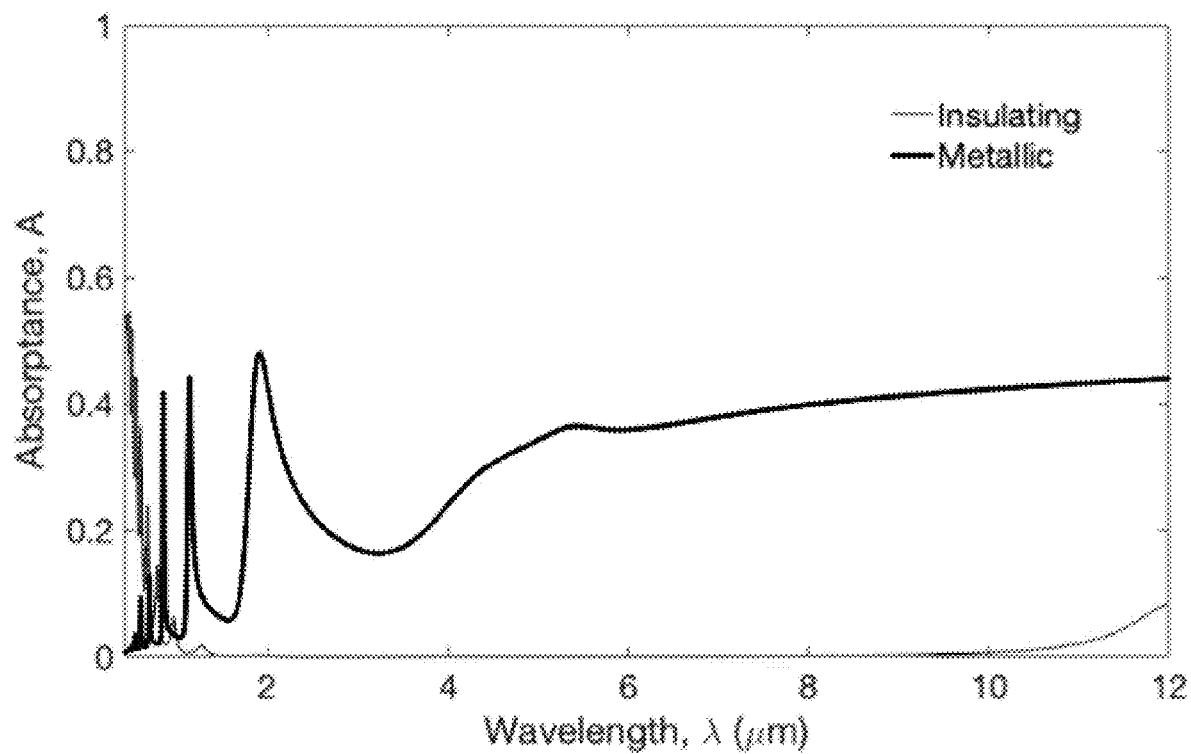

FIGS. 3A, 3B, and 3C show the transmittance, reflectance, and absorptance spectrums, respectively, calculated for a particular but non-limiting example of the contemplated tuned filter 100, at normal incidence. As shown, a transmittance peak is successfully achieved when vanadium dioxide 110 is in the insulating phase while the structure becomes broadly opaque when vanadium dioxide 110 is metallic. As shown, this embodiment exhibits a transmittance peak along with a reflectance dip at 4 μm wavelength when vanadium dioxide 110 is in its insulating phase, in which case the structure is almost non-absorbing. However, when vanadium dioxide 110 is metallic, the transmittance drops significantly across all wavelengths due to high absorption.

According to various embodiments, when the total phase shift within the spacer layer 104 is an integer multiple of 7C, standing waves exist within the cavity, leading to a transmittance peak through the thin-film layers. The total phase shift w can be calculated with the following relationships:

$$2\psi = 2\beta + \phi_b + \phi_s$$

$$\beta = 2\pi n_d t_d \cos\theta_d / \lambda$$

where β is the phase shift experienced after traveling across the spacer layer 104 once. The phase angles $\phi_b$ and $\phi_s$ are the phase angles of the reflection coefficients between the vacuum and the silicon spacer layer 104 and between the silicon spacer layer 104 and the calcium fluoride 122 substrate 108. These phase angles depend on the properties of the layers separating the vacuum and spacer layer 104 or the spacer and thermochromic layers, respectively. Therefore, the vanadium dioxide 110 layers that are surrounding the spacer layer 104 should have a large enough index of refraction difference with respect to the spacer layer 104 in order to be reflective and create constructive interference for waves that are exiting the spacer. These layers should also be semitransparent in order to allow light to enter the Fabry-Perot cavity in the first place. The substrate material should be transparent in order to prevent attenuation of the transmitted light.

Figure 4:
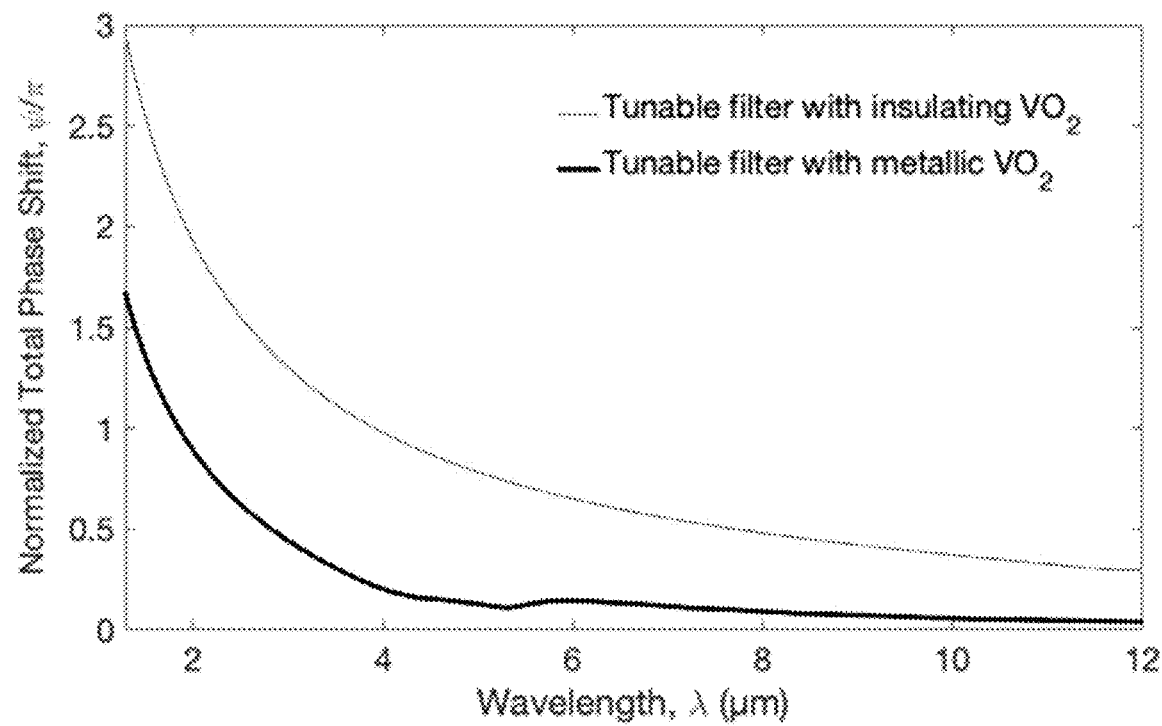
FIG. 4 shows the total phase shift within a dynamic nanophotonic filter for both states of $VO_2$.

The total phase shift of this filter 100, normalized by π, when the vanadium dioxide 110 is insulating and when it is metallic is shown in FIG. 4, for normal incidence. As shown, when vanadium dioxide 110 is in its insulating phase, the normalized total phase shift for the filter 100 crosses an integer at 4 μm wavelength, which agrees well with the location of the transmittance peak. The resonance peaks at shorter wavelengths are basically similar Fabry-Perot resonance at higher orders.

It is important to note that the total phase shift depends on both the incident angle and polarization of the incident light. For normal incidence, as is the case for the calculations resulting in FIG. 4, the values of the total phase shift for s- and p-polarized light will be different but will still cross integer multiples of π at the same wavelengths. Additionally, the total phase shift explains only the wavelengths corresponding to the transmittance peaks, but not the magnitude of the transmittance peaks.

As previously mentioned, various properties of the contemplated filter 100 may be tuned by modifying the thickness of the various layers, because the total phase shift depends also on the thin-film layer thicknesses (i.e., first thickness 114 and second thickness 116) of the filter 100. According to various embodiments, modifying the thicknesses can allow the transmittance peak to be placed in a desired wavelength. Furthermore, the thickness of the vanadium dioxide 110 layers can be used to modulate the transmittance while the vanadium dioxide 110 is metallic, due to its high extinction coefficient.

Figure 5A:
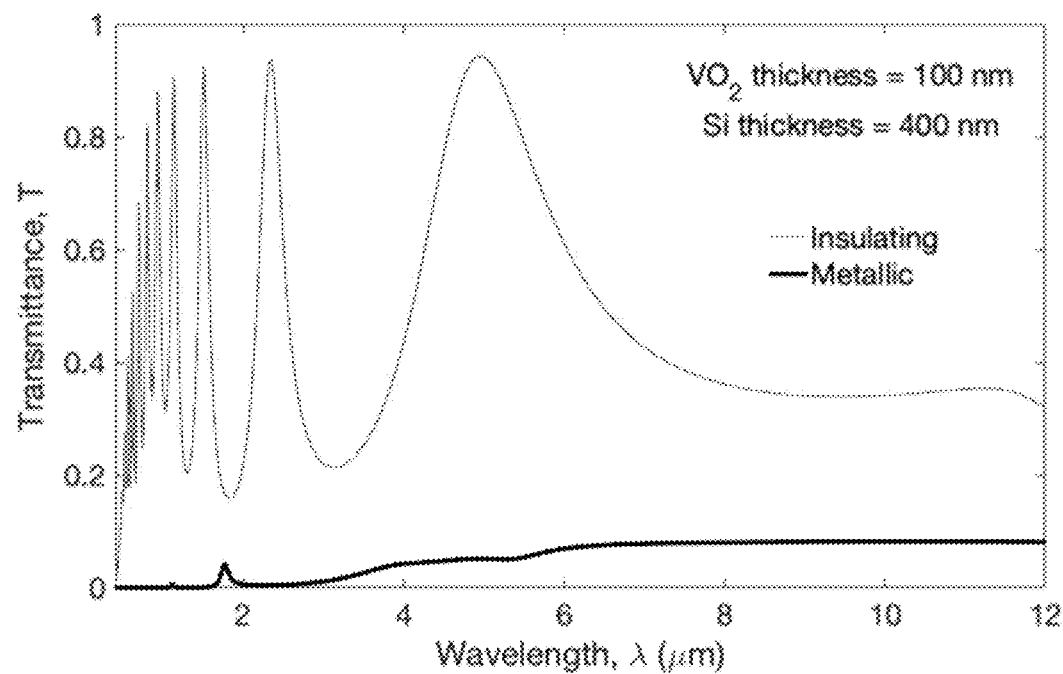
FIGS. 5A and 5B show the calculated normal transmittance from embodiments of the nanophotonic filter having different layer thicknesses.
Figure 5B:
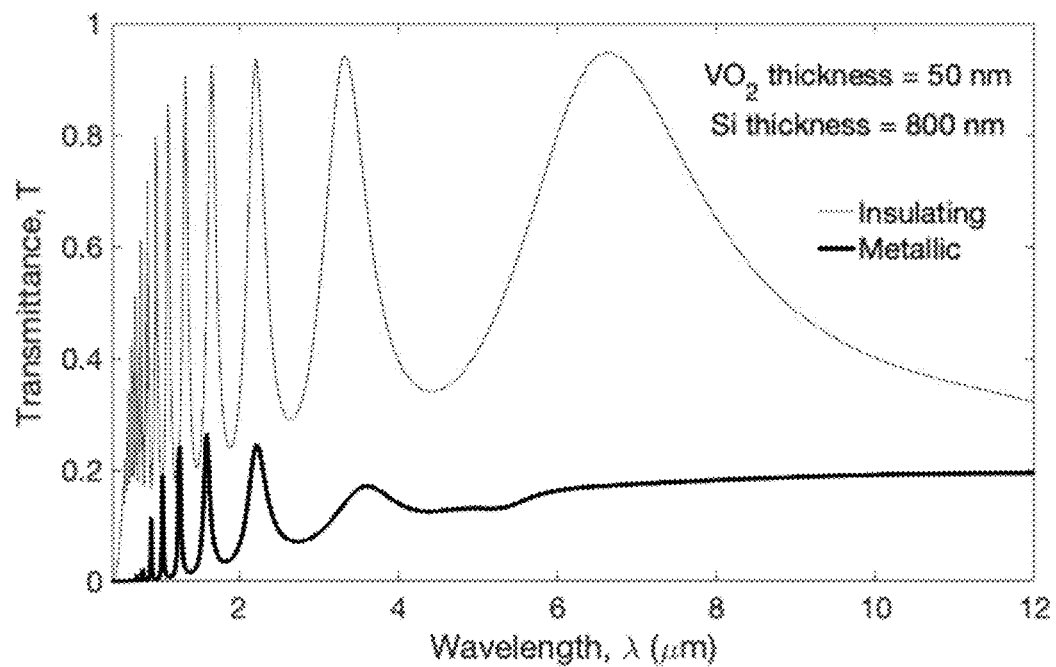

FIGS. 5A and 5B show the calculated normal transmittance from variations on the specific, non-limiting example of a tunable nanophotonic filter 100 previously discussed. Specifically, FIG. 5 shows the normal transmittance when (a) the vanadium dioxide 110 layer thicknesses (i.e., first thickness 114 and second thickness 116) are doubled to 100 nm or when (b) the silicon spacer thickness 118 is doubled to 800 nm, whereas other parameters are kept the same from the base structure (e.g., 50 nm $VO_2$/400 nm Si/50 nm $VO_2$/1 mm $CaF_2$ substrate). As shown, increasing the vanadium dioxide 110 layer thickness has a small effect on the location of the transmittance peaks while vanadium dioxide 110 is insulating, but greatly decreases the transmittance while vanadium dioxide 110 is metallic. Increasing the silicon spacer layer thickness 118 has the effect of dramatically changing the location of the transmittance peaks while vanadium dioxide 110 is insulating; resonance effects depend greatly on the thickness 118 of the spacer layer 104. The silicon layer thickness 118 does not have a great impact on the transparency of the structure while vanadium dioxide 110 is metallic. The ability to arbitrarily place the transmittance peaks while semi-transparent and to decrease the broadband transmittance while opaque is advantageous, resulting in the filter 100 being able to be tuned and optimized for different applications.

The ability to switch between selectively allowing radiation of a specific wavelength range to pass through a device and broadly obstructing all radiation from passing through shows promise in radiative heat transfer applications. Advantageously, the versatility of the contemplated filter 100 allows it to be tuned and optimized for specific applications. Two non-limiting examples will be discussed below, dynamic radiative energy dissipation and thermal camouflage. Specifically, the performance of the contemplated tunable dynamic filter 100 in energy dissipation applications where the radiative heat transfer from a surface can be modulated, and in a thermal camouflage application where the apparent temperature of a hot surface is decreased.

Figure 6:
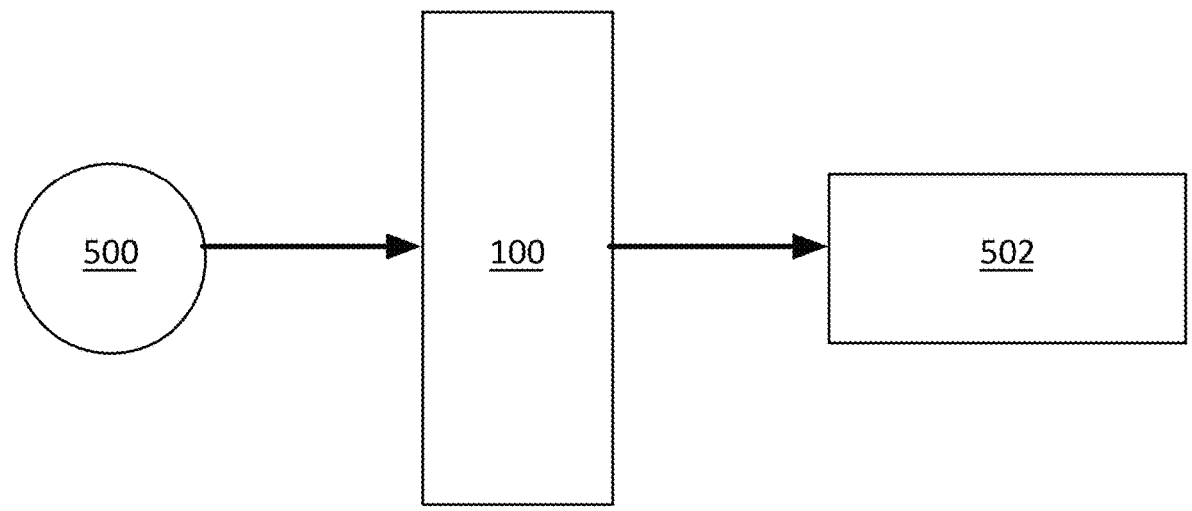
FIG. 6 is a schematic view of an experimental setup to evaluate the performance of the dynamic nanophotonic filter.

FIG. 6. is a schematic view of a non-limiting example of an experimental setup to evaluate the performance of various embodiments (e.g., mid-infrared) of the contemplated filter 100 in energy dissipation and thermal camouflage applications. As shown, the basic idea behind these applications places the tunable filter 100 between a thermal emitter 500 and a heat sink (e.g., deep space at 3 K) or an infrared detector 502 (e.g., detector seeking the hot surface to be camouflaged, etc.).

The radiative heat dissipation of a hot surface can be controlled by placing the filter 100 before it. When the filter 100 is semi-transparent with insulating $VO_2$ 110, radiative energy within the pass band of the filter 100 is allowed to pass through. On the other hand, radiative heat dissipation is suppressed when the filter 100 becomes opaque with metallic $VO_2$ 110. In order to achieve the greatest modulation, the difference in transmitted radiative energy between these two states should be as large as possible, according to various embodiments.

For simplicity, the following theoretical analysis will be done in the context of a black emitter (i.e., ε=1) at a temperature of 900 K, whose peak wavelength is 3.22 µm, matching well with the transmittance peak of the specific embodiment of the contemplated filter 100 discussed above. Again, it should be noted that this specific embodiment is non-limiting, and other embodiments of the contemplated filter 100 may employ differing materials and/or thicknesses.

Figure 7:
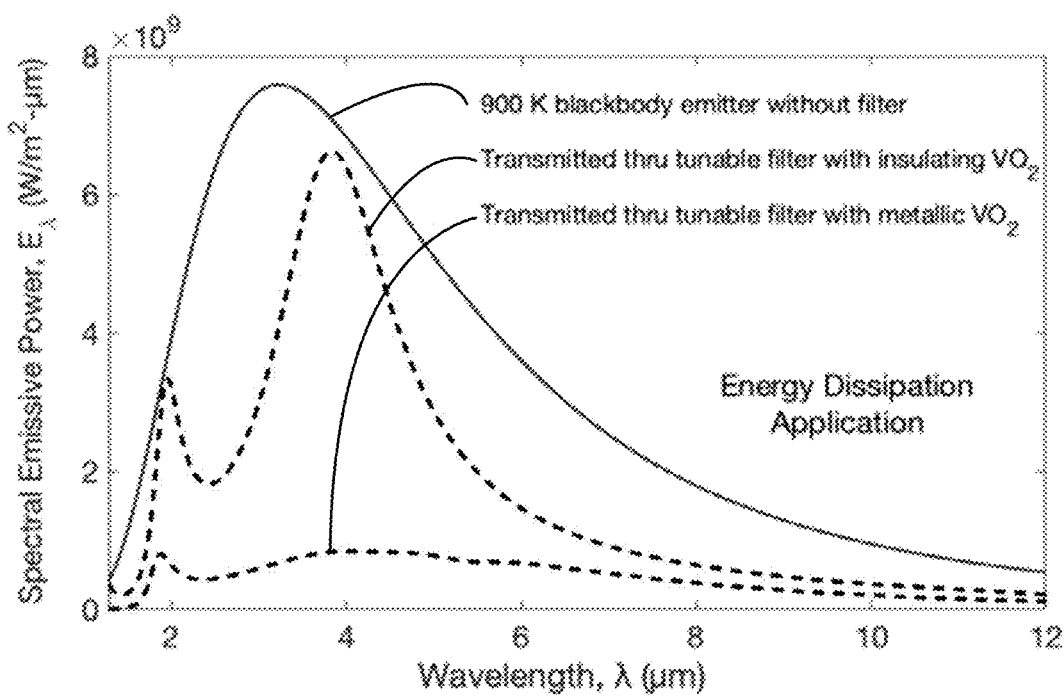
FIG. 7 shows the calculated spectral transmitted power from an embodiment of the dynamic nanophotonic filter, in response to a 900 K blackbody emitter.

FIG. 7 shows the calculated spectral transmitted power from the specific embodiment (a non-limiting example) of the contemplated tunable nanophotonic filter 100 (i.e., 50 nm $VO_2$/400 nm Si/50 nm $VO_2$ atop a 1 mm $CaF_2$ substrate) from a 900 K blackbody emitter. When the $VO_2$ 110 is in insulating phase, the filter 100 could pass through 51% of the total emissive energy from the 900 K black emitter thanks to the large transmission peak around 4 µm wavelength. When the $VO_2$ 110 becomes metallic, the filter 100 has much reduced transmittance so that only 13% of the total energy is allowed to go through for dissipation. By utilizing the contemplated tunable filter 100, the allowable energy dissipation from the 900 K black emitter could be reduced by nearly 75%.

According to various embodiments, changes in the layer thicknesses are able to optimize the transmittance spectrum of the filter 100 to be better suited for a known application. In this particular example, the filter 100 can be optimized for the known emitter parameters. The optimization can be performed using the power reduction ($P_{reduced}$), a relative measure of the difference in power transmitted between semi-transparent ($P_{insulating}$) and opaque states ($P_{metallic}$), and the power difference ($P_{difference}$), an absolute measure between the transmitted powers.

$$P_{reduced} = 1 - \frac{P_{metallic}}{P_{insulating}}$$

$$P_{difference=} = P_{insulating} - P_{metallic}$$

A power reduction of zero indicates that there is no difference between the transmitted power between insulating and metallic vanadium dioxide states, while a unitary power reduction can indicate that the power transmittance while vanadium dioxide 110 is metallic is zero or much less than the transmittance through insulating vanadium dioxide 110. Because a relative figure of merit has potentially inconclusive results and can show favorable results regardless of the power transmission through the semi-transparent filter, an absolute figure of merit in the power difference is also considered. In the following, the transmitted power is calculated by spectral integration from spectral power transmitted from a blackbody emitter at 900 K.

Figure 8A:
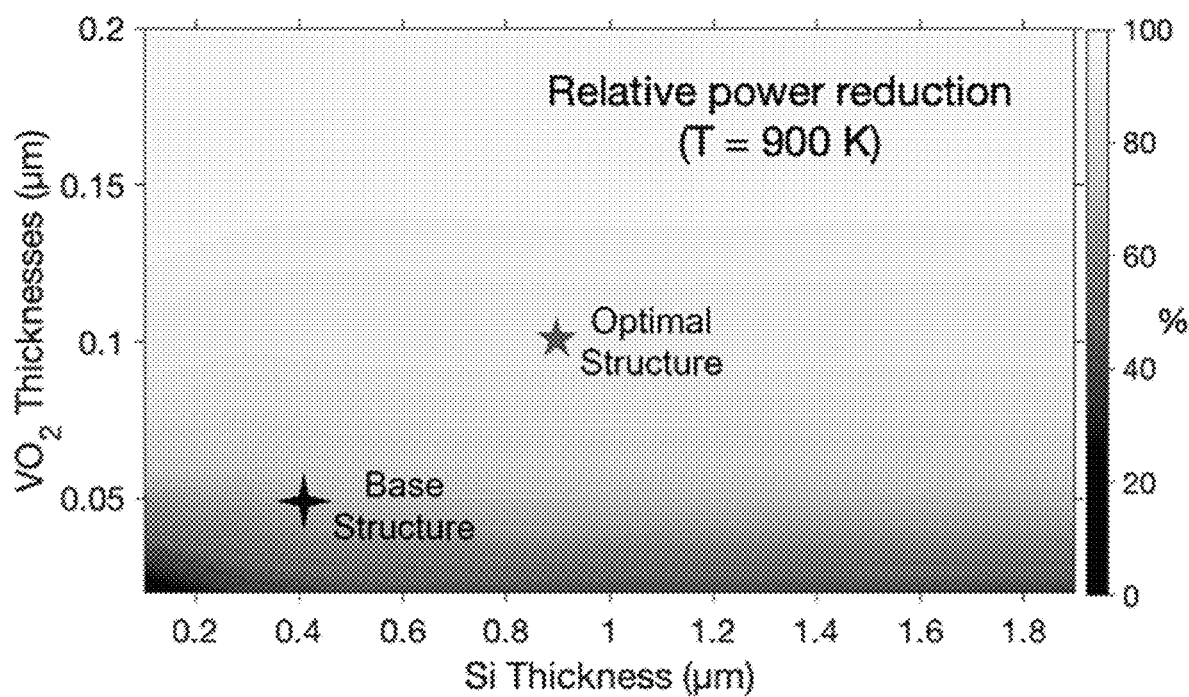
FIGS. 8A and 8B show the results of an optimization based on layer thicknesses of a range of embodiments of the dynamic nanophotonic filter, showing the relative and absolute power reduction, respectively.
Figure 8B:
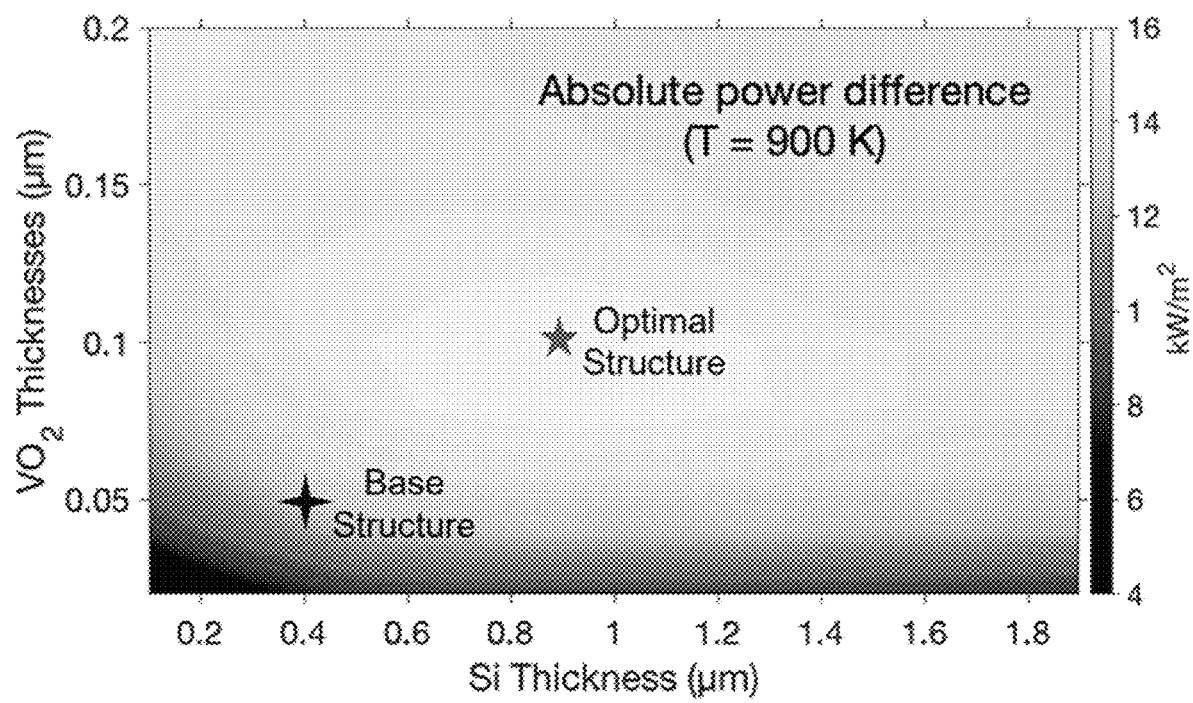

The results of an optimization based on the layer thicknesses is shown in FIGS. 8A and 8B, where the layer thicknesses are varied in a non-limiting example of a dynamic nanophotonic filter 100. Specifically, FIG. 8A shows the relative power reduction and FIG. 8B the absolute power difference calculated as a function of the vanadium dioxide layer thicknesses (i.e., first thickness 114 and second thickness 116) and the silicon spacer layer thickness 118 of this specific, non-limiting example of the contemplated tunable nanophotonic filter 100 for energy transmission from a blackbody emitter at 900 K.

As shown, the relative power reduction is dominated by the vanadium dioxide 110 thickness. According to various embodiments, an increase in vanadium dioxide thickness drastically reduces the low transmittance at its metallic phase, which in turn drives down the relative figure of merit. The absolute power difference between these two states shows a region of high power difference up to 15.5 kW/m2 from optimized structures with a vanadium dioxide thickness of approximately (i.e., within 10%) 100 nm and a silicon thickness of approximately (i.e., within 10%) 900 nm, where the relative power reduction is nearly 90%. According to various embodiments, this occurs when a resonance transmittance peak matches with the peak wavelength of the infrared emitter at this temperature while the vanadium dioxide 110 prevents high transmittance while it is in its metallic state. According to various embodiments, a dynamic nanophotonic filter 100 may be tuned by choosing the first thickness 114, the second thickness 116, and the spacer thickness 118 to maximize a power transmission difference between the semi-transparent state and the opaque state while the dynamic nanophotonic filter 100 is exposed to radiation 126.

The contemplated nanophotonic filter 100 may be used in thermal camouflage applications, according to various embodiments. The apparent temperature is determined from the radiation between 3 and 5 μm that is allowed to pass through the atmospheric transmission window. A mid-wave infrared detector collects the radiation in this spectral range in order to measure the temperature of a surface. If the radiation is attenuated by the filter, the reduced power emission would cause the measured apparent temperature to be lower than the true temperature of the surface.

According to various embodiments, the apparent temperature can be determined through an integration in the mid-wave infrared window such that the power transmitted through the filter 100 is equal to the power emitted by a lower temperature blackbody as $$P_{MWIR} = \int_{3\,\mu m}^{5\,\mu m} \tau_\lambda E_{b\lambda}(T_s) d\lambda = \int_{3\,\mu m}^{5\,\mu m} E_{b\lambda}(T_{app}) d\lambda$$

Figure 9:
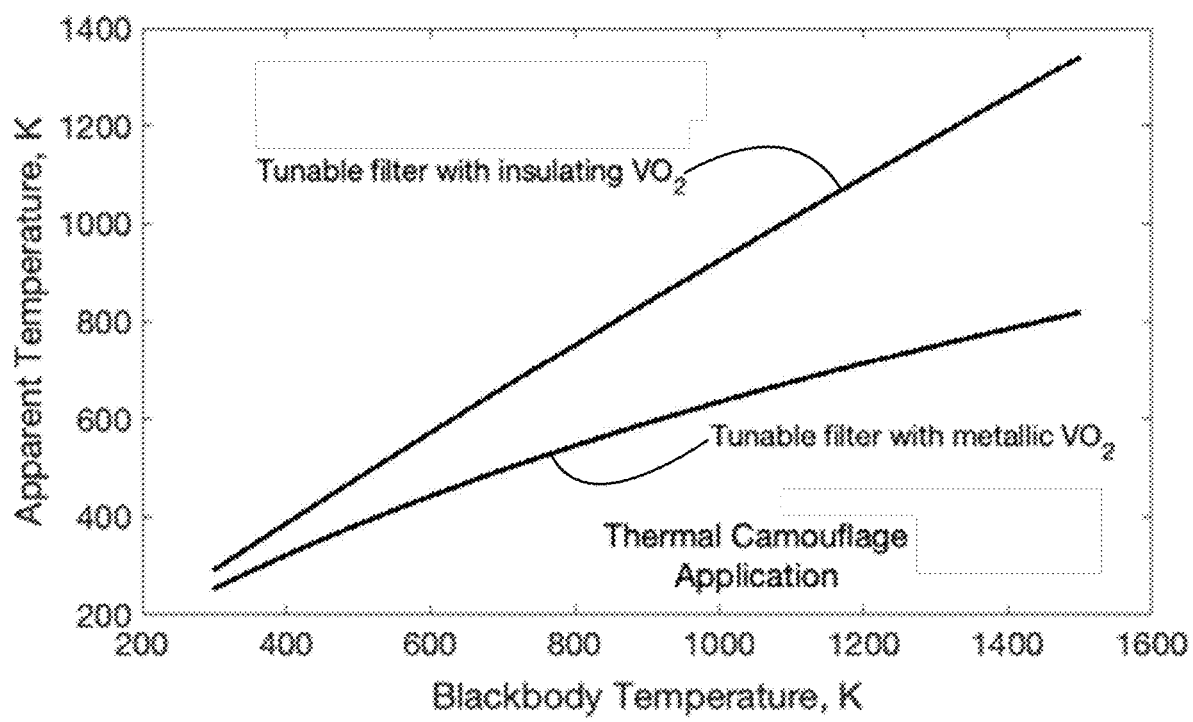
FIG. 9 shows the predicted apparent temperature of a blackbody as a function of the blackbody temperature, as seen through a dynamic nanophotonic filter used as thermal camouflage.

FIG. 9 shows the predicted apparent temperature of a blackbody as a function of the blackbody temperature as seen through the same, specific embodiment of the contemplated tunable nanophotonic filter 100 with base structure (i.e., 50 nm VO$_2$/400 nm Si/50 nm VO$_2$/1 mm CaF$_2$ substrate) for both insulating and metallic vanadium dioxide 110 based on the transmitted power within 3-5 μm spectral range. This indicates that a blackbody surface viewed through the filter 100 while it is semi-transparent with insulating VO$_2$ will show approximately the true temperature. Furthermore, when the surface is viewed through the opaque filter 100 with metallic VO$_2$, the apparent temperature is significantly lower than the true surface temperature, with a reduction of about 600 K when the blackbody is 1500 K.

The performance of the contemplated filter 100, when applied as thermal camouflage, can also be optimized using the thicknesses of the thin-film layers, according to various embodiments. In an idealized case, placing the filter 100 over a surface would make it undetectable using an infrared camera. In other words, the apparent temperature would be at ambient temperature when the filter 100 is in the opaque state.

Figure 10A:
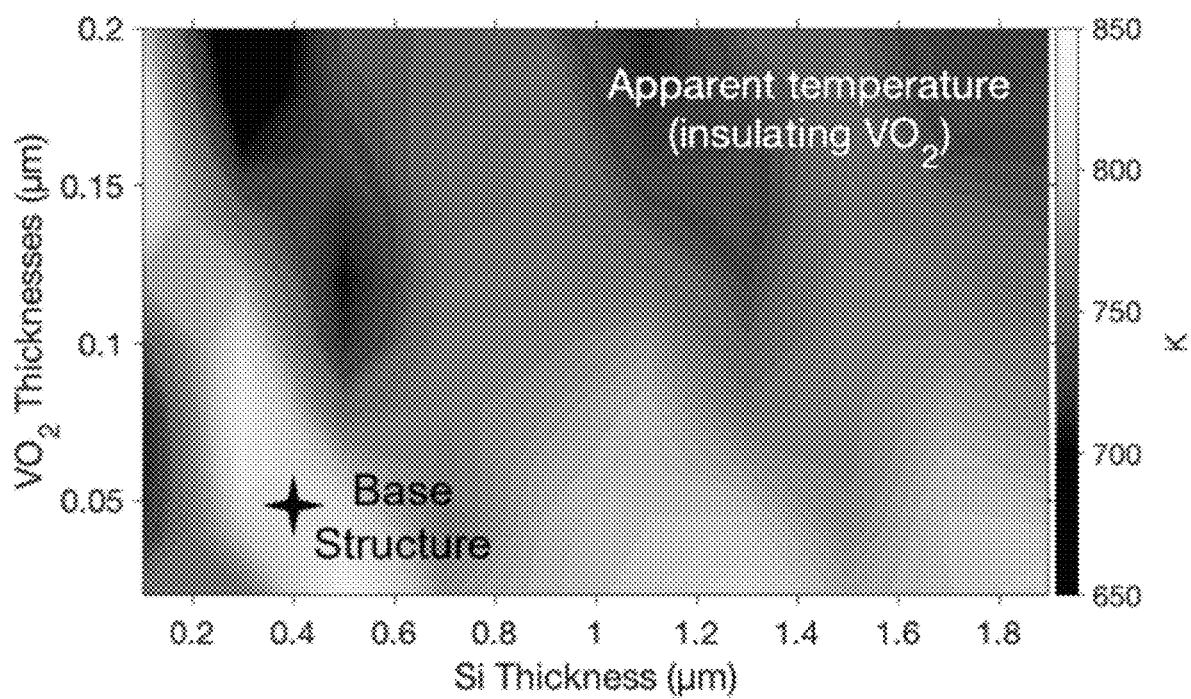
FIGS. 10A and 10B show contour plots of the apparent temperature of a blackbody emitter as a function of layer thicknesses when the vanadium dioxide is (a) insulating and (b) metallic, respectively.
Figure 10B:
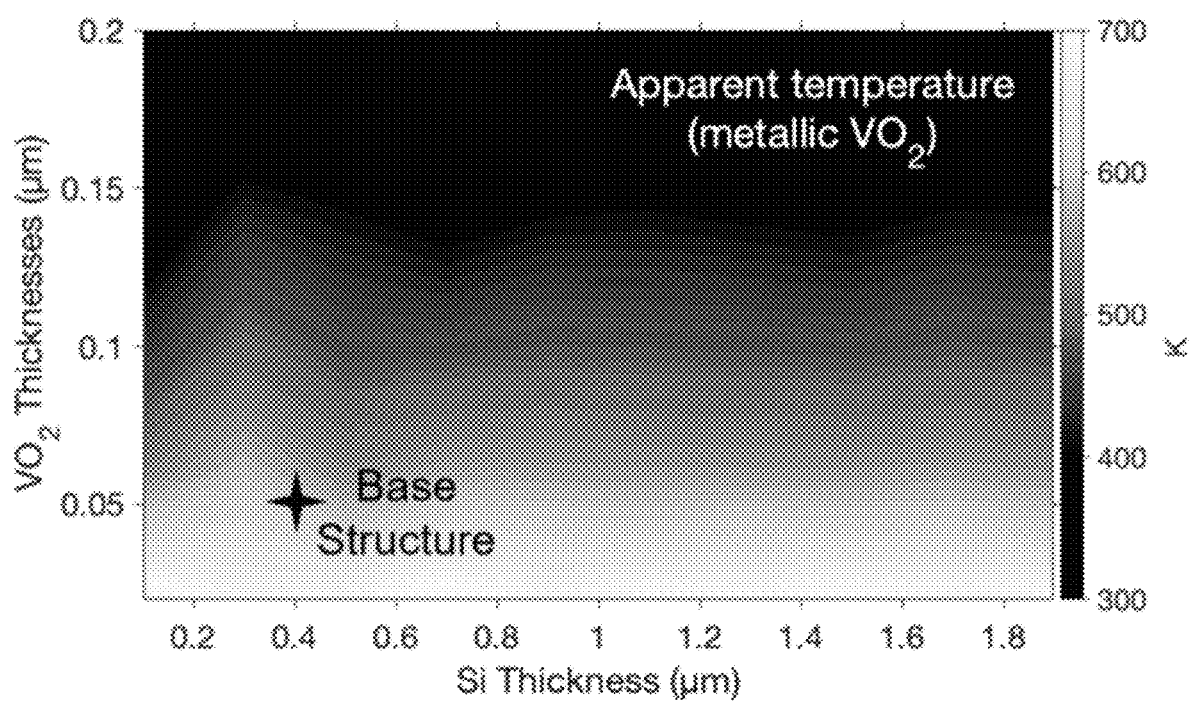
Figure 10C:
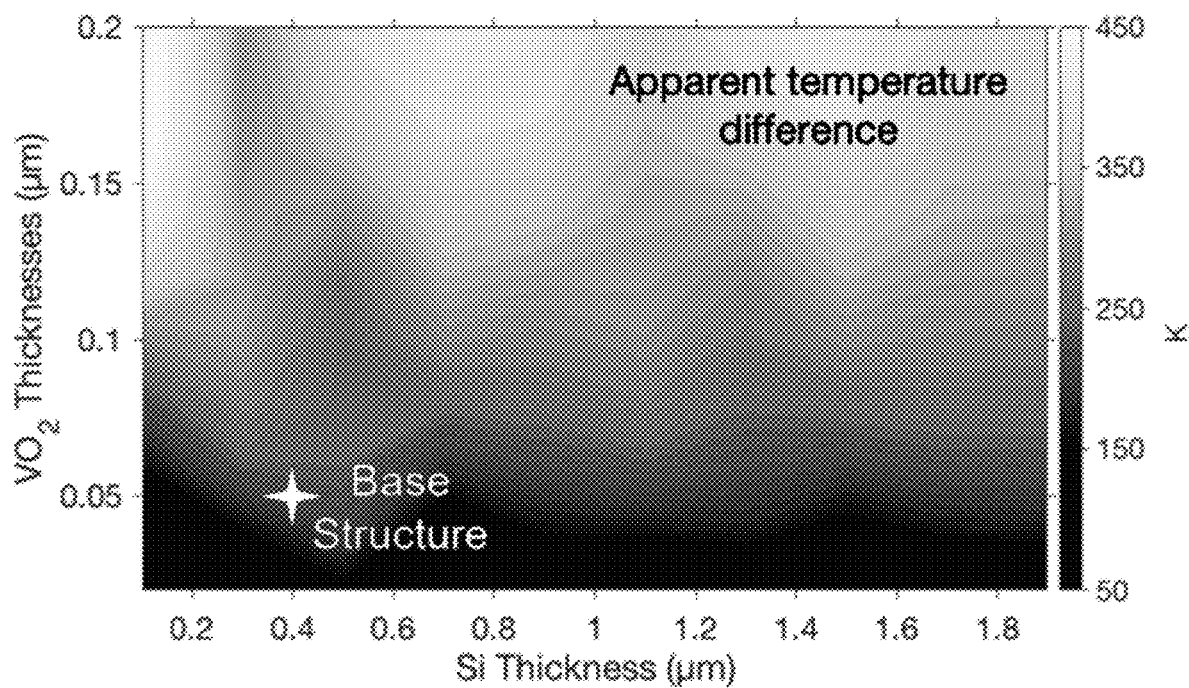
FIG. 10C shows a contour plot of the difference in apparent temperatures between the insulating and metallic states of FIGS. 10A and 10B.

FIGS. 10A-10C show contour plots of the apparent temperature of a blackbody emitter at 900 K as a function of the vanadium dioxide 110 layer thicknesses and the silicon spacer layer thickness 118 when the vanadium dioxide 110 is (a) insulating and (b) metallic along with (c) the difference in apparent temperatures between these two states. The other properties of the filter 100 are held the same as the specific embodiment that has been the context for the previous discussion. Because increasing the vanadium dioxide layer thickness (i.e., first thickness 114 and second thickness 116) dramatically decreases the transmittance of the filter 100 and therefore greatly reduces the radiation that can be observed, the apparent temperature is greatly reduced when vanadium dioxide layer thickness is increased.

For example, in a non-limiting embodiment where the vanadium dioxide layer thickness (i.e., first thickness 114 and second thickness 116) is set to 200 nm, the apparent temperature is nearly 300 K for most thicknesses of silicon 124 (i.e., the spacer layer 104), which is an optimal performance for the device as the camouflaged region would be thermally indistinguishable from its surroundings. When the vanadium dioxide 110 is insulating, regions of high apparent temperature are observed to be periodic with silicon thickness (i.e., spacer thickness 118). This is due to non-primary resonance transmission peaks matching with the peak emitting wavelength at this temperature. When this occurs, radiative heat transfer is promoted, and more energy is detected by the power meter. When there is a mismatch between the transmittance and emittance peaks of the filter 100 and blackbody, the majority of the energy is not emitted in a spectrum that is allowed to pass through the filter 100 and therefore cannot increase the apparent temperature.

Advantageously, the contemplated filter 100 may be dynamically switched between opaque and semi-transparent states with a change in temperature. The benefit of the opaque state in the context of thermal camouflage is apparent. However, the semi-transparent state, and the ability to switch to it at will, is also beneficial, according to various embodiments. The advantage of allowing the filter 100 to switch into a semi-transparent state is for the surface to radiatively cool when thermal camouflage is not required. This would require the temperature of the filter 100 to be controlled, in order to switch the vanadium dioxide 110 between insulating and metallic phases in response to the need for thermal camouflage. In some embodiments, the filter 100 also has moderate absorptance and can potentially maintain its opaque state with only the radiated heat from the underlying surface if it is hot enough, eliminating the need for an external energy source to maintain thermal camouflage.

It will be understood that implementations are not limited to the specific components disclosed herein, as virtually any components consistent with the intended operation of a method and/or system implementation for a tunable nanophotonic infrared filter may be utilized. Accordingly, for example, although particular tunable dynamic nanophotonic filters may be disclosed, such layers may comprise any shape, size, style, type, model, version, class, grade, measurement, concentration, material, weight, quantity, and/or the like consistent with the intended operation of a method and/or system implementation for a tunable dynamic nanophotonic filter may be used. In places where the description above refers to particular implementations of a dynamic nanophotonic filter, it should be readily apparent that a number of modifications may be made without departing from the spirit thereof and that these implementations may be applied to other nanophotonic filters.

What is claimed is:

1. A method for fabricating a tuned dynamic nanophotonic filter, comprising:
tuning a dynamic nanophotonic filter that changes between a semi-transparent state and an opaque state based on temperature, the dynamic nanophotonic filter comprising a transparent substrate, a first layer of thin-film thermochromic $VO_2$, a spacer layer, and a second layer of thin-film thermochromic $VO_2$, the tuning comprising choosing a first thickness of the first layer, a second thickness of the second layer, and a spacer thickness of the spacer layer such that the dynamic nanophotonic filter exhibits a desired behavior in at least one of the semi-transparent state and the opaque state; and
fabricating the tuned dynamic nanophotonic filter by:
depositing a first precursor layer of vanadium directly onto a transparent substrate composed of calcium fluoride ($CaF_2$);
oxidizing the first precursor layer until the vanadium of the first precursor layer is fully oxidized and the first precursor layer becomes the first layer of thin-film thermochromic $VO_2$ as determined by the examination of a first spectral transmittance, with the first precursor layer sized such that the first layer has the first thickness;
depositing the spacer layer directly onto the first layer, the spacer layer composed of intrinsic silicon and having the spacer thickness;
depositing a second precursor layer of vanadium directly onto the spacer layer; and
oxidizing the second precursor layer until the vanadium of the second precursor layer is fully oxidized and the second precursor layer becomes the second layer of thin-film thermochromic $VO_2$ as determined by the examination of a first spectral transmittance, with the second precursor layer sized such that the second layer has the second thickness.

2. The method of claim 1, wherein the spacer thickness is chosen to tune the dynamic nanophotonic filter to have a transmittance peak in a target spectral location when in the semi-transparent state.

3. The method of claim 1, wherein the first thickness and the second thickness are chosen to tune the dynamic nanophotonic filter to exhibit an attenuation when in the opaque state.

4. The method of claim 1, wherein the first thickness, the second thickness, and the spacer thickness are each chosen to tune the dynamic nanophotonic filter to maximize a power transmission difference between the semi-transparent state and the opaque state while the dynamic nanophotonic filter is exposed to a radiation.

5. The method of claim 4:
wherein the radiation is from a blackbody emitter at 900 K;
wherein the first thickness and the second thickness are each 100 nm; and
wherein the spacer thickness is 900 nm.

* * * * *